Figure 1:
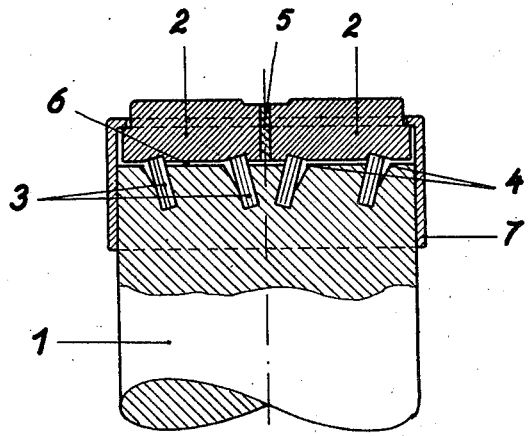

Jan. 11, 1955  W. ECKOLD ET AL  2,699,079
TOOL FOR DEFORMING SHEET METAL ARTICLES
OR PROFILED ELEMENTS
Filed Dec. 15, 1950

Inventors
Walter Eckold &
Gerd-Jürgen Eckold
By Young, Emery & Thompson
Attys.

United States Patent Office 2,699,079
Patented Jan. 11, 1955

2,699,079

TOOL FOR DEFORMING SHEET METAL ARTICLES OR PROFILED ELEMENTS

Walter Eckold and Gerd-Jürgen Eckold, St. Andreasberg (Sperrluttertal), Germany

Application December 15, 1950, Serial No. 201,024

Claims priority, application Germany December 17, 1949

1 Claim. (Cl. 78—61)

The invention relates to a tool for deforming sheet metal articles or profiled elements, more especially by swaging or drawing, which tool consists substantially of two pairs of jaws which clamp the material between them and are movable in relation to one another in such a direction as to exert a swaging or drawing action.

In the known tools of this nature, the jaws of the two pairs are slidably mounted in plano-parallel carrier members or are fashioned as prismatic members running on corresponding guide-surfaces of carrier members, the jaws being provided with interengaging comb-like serrations to prevent formation of folds.

Neither of these two types of tools meets the requirements arising in practical operation. The former is attended by the disadvantage that the forces required, one of which is exerted in the vertical direction in order to generate the pressure for firmly clamping the material and the other in the horizontal direction for controlling the swaging or drawing movement, complicate the construction of the tool and consequently impair the operational reliability thereof. In this respect, the prismatic bedding of the jaws constitutes a definite improvement in that a pressure exerted vertically on the jaws not only firmly clamps the material, but also initiates the swaging movement.

However both types of tools have the disadvantage that owing to the comb-like serrations of the jaws, scale and dirt can freely reach the sliding surfaces of the jaws, whereby the necessary oil film on the sliding surfaces is destroyed after a short period of operation, which results first in increased losses by frictions and finally in seizing of the jaws, which must then first be cleaned and lubricated before they can be put in operation again.

The invention has for its object to remove these disadvantages of the known tools, and is based upon the idea of eliminating the mounting of the jaws on sliding surfaces. The invention resides in principle in the fact that the distance of the jaws from their fixed carrier members can be varied during operating owing to the fact that they bear on yieldable, preferably elastic, supporting elements fitted between them, which enable the pairs of jaws to carry out the opposite swaging or drawing movement. These supporting elements may, for example, each consist of one or more steel laminations fitted in inclined slots or recesses in the carrier members and jaws. The steel laminations are so dimensioned and the slots thereof are so inclined that when the jaws are pressed together with the material to be deformed firmly clamped between them, the steel laminations yield and thus initiate the opposite movement of the pairs of jaws necessary for the swaging or drawing of the material. The inclination of the slots depends upon the purpose for which the tool is employed, that is, swaging or drawing. The steel laminations and slots may be distributed over the surfaces of the jaws and carrier members either uniformly, for example in parallel rows, or non-uniformly.

Instead of steel laminations, use may be made, for example, of rows of steel pins, for which corresponding inclined apertures or recesses must then be formed in the carrier members and jaws.

It may also be advantageous to combine more than two co-operating pairs of jaws in one tool. It is then possible, by suitably fashioning and differently orienting the supporting elements, to effect different deformations of the clamped material in one operation, for which purpose the carrier elements of the individual jaws may be fitted at different inclinations in order thus to produce an opposite rotational movement. In this case, the tool may be so constructed that the jaws are interchangeably mounted and secured, so that they may be employed for stretching or swaging according to requirement.

In order to prevent formation of folds, there is provided between two juxtaposed jaws, an elastic buffer, for example of rubber, which has the additional function of moving the jaws apart from one another, when the pressing force is removed, while at the same time preventing the penetration of scale and dirt into the interior of the tool and especially to the carrier elements.

Figure 2:
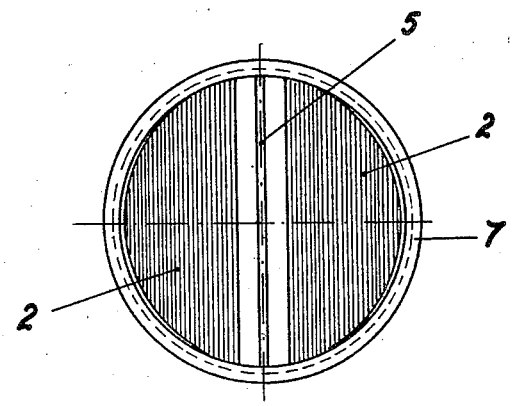
Figure 3:
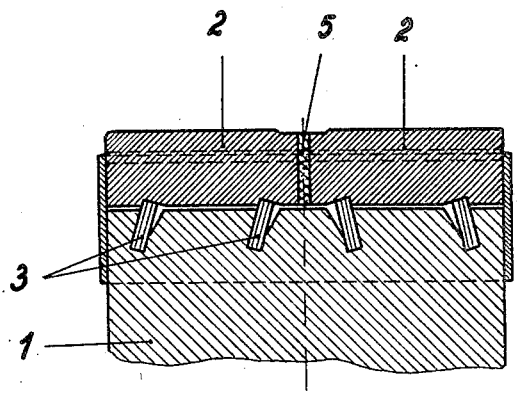

One form of construction of the invention is illustrated by way of example in the accompanying drawings in which, Figure 1 is a section of a drawing tool,
Figure 2 is a plan view, and
Figure 3 shows a swaging tool according to the invention.

In the embodiments shown by way of example, 1 is the supporting member for the drawing or swaging jaws 2.

In the embodiment shown in Figures 1 and 2, bundles 3 of steel lamination are fitted in corresponding slots or recesses in the supporting member 1 and the jaws 2, the said laminations being so inclined that when a ram of similar form presses from above on the jaws 2 the steel laminations 3 widen out owing to the widening of the slots 4 in the supporting member, whereby the jaws 2 carry out an outward movement which draws the clamped material. Provided between the jaws 2 is an elastic buffer 5 which prevents scale and dirt from entering the gap 6 between the jaws and the supporting member and thus reaching the steel laminations 3.

Disposed around the jaws and the supporting member is a ring 7 which not only limits the outward movement of the jaws 2, but also prevents the lateral penetration of dirt into the gap 6 between the members 1 and 2.

In the swaging tool shown in Figure 3, the bundles of steel laminations 3 are reversed, that is to say, are arranged in the opposite direction, so that when pressure is exerted on the jaws 2 they close so as to swage the material. The inserted buffer 5 here serves to prevent formation of folds in the swaging operation and has the simultaneous function of supporting the opening movement of the jaws when the pressure is removed.

The two embodiments shown are only intended to illustrate the basic idea of the invention. It will be obvious that it is possible on the same principle to construct combined tools which alternately draw and swage the clamped material. If the tool is made sufficiently long and the inclination of the slots is varied, tools having a twisting action can also be produced. It is thus possible in practice, by varying the disposition of the slots and carrier elements, to effect any type of deformation of sheet metal articles and profiled elements in one working operation.

What we claim is:

A tool for deforming sheet metal and profiled elements, especially for swaging and drawing, comprising a pair of adjacent jaws to directly contact the sheet metal to be deformed, a supporting member for the jaws having inclined slots therein, each slot having a widened part at one side thereof extending approximately mid-way down into the slot, and an elastic steel member mounted rigidly in the bottom of each slot in spaced relation in the supporting member to contact and support the jaws, the slots for each jaw being parallel to each other, and the elastic steel members being mounted at angles relative to the jaws so that the pair of jaws will tend to move counter to each other in plane parallel relationship on the supporting member by movement of the upper part of each elastic steel strip toward the widened part of its slot.

(References on following page)

References Cited in the file of this patent

UNITED STATES PATENTS

| | | |
|---|---|---|
| 1,761,887 | Junkers | June 3, 1930 |
| 1,761,888 | Junkers | June 3, 1930 |
| 2,010,996 | Junkers | Aug. 13, 1935 |
| 2,023,638 | Lawson | Dec. 10, 1935 |
| 2,060,675 | Kirchner | Nov. 10, 1936 |
| 2,407,573 | Nelson | Sept. 10, 1946 |
| 2,425,913 | Beard | Aug. 19, 1947 |
| 2,428,173 | Moore | Sept. 30, 1947 |

FOREIGN PATENTS

| | | |
|---|---|---|
| 575,086 | Great Britain | Feb. 1, 1946 |